United States Patent

Van Ostrand

[15] 3,678,356

[45] July 18, 1972

[54] FREQUENCY RESPONSIVE ELECTRICAL CIRCUIT

[72] Inventor: William F. Van Ostrand, Hagerstown, Ind.

[73] Assignee: Dynamic Precision Controls Corporation, Hagerstown, Ind.

[22] Filed: Sept. 26, 1967

[21] Appl. No.: 670,703

[52] U.S. Cl. ............................................318/341, 307/265

[51] Int. Cl. ..................................................H02p 5/06

[58] Field of Search..............318/331, 332, 341, 345, 326–9; 307/265, 273, 290; 332/9; 328/16, 111, 133, 4

[56] References Cited

UNITED STATES PATENTS

| | | | |
|---|---|---|---|
| 3,093,756 | 6/1963 | Rywak | 328/111 X |
| 2,968,748 | 1/1961 | Davenport | 307/273 X |
| 3,079,539 | 2/1963 | Guerth | 332/9 X |
| 3,284,689 | 11/1966 | Rosa | 318/345 X |
| 3,304,437 | 2/1967 | Dano | 307/265 X |
| 3,358,236 | 12/1967 | Weber | 307/265 X |
| 3,409,814 | 11/1968 | Azuma et al. | 318/341 |

FOREIGN PATENTS OR APPLICATIONS

| | | |
|---|---|---|
| 1,039,045 | 8/1966 | Great Britain |

*Primary Examiner*—J. D. Miller
*Assistant Examiner*—Robert J. Hickey
*Attorney*—Hibben, Noyes & Bicknell

[57] ABSTRACT

This disclosure deals with an electrical circuit designed to receive a train of input signals and produce an output signal that is indicative of the frequency at which the input signals are received. When the frequency of the input signals is below a critical value, the output signal is in the form of pulses having a width which is proportional to the input signal frequency, and when the input signal frequency is above this critical value, the output signal is zero.

6 Claims, 8 Drawing Figures

Inventor:-
William F. Van Ostrand,
By Hibben, Noyes & Bicknell,
Attys.

FREQUENCY RESPONSIVE ELECTRICAL CIRCUIT

Numerous types of electrical convertor circuits have been provided for converting electrical energy from one form to another. However, no one has provided a frequency-to-pulse-width convertor circuit wherein the pulse width may be varied, and wherein, for each setting of the convertor circuit, there is a critical frequency wherein the pulse width is zero.

In accordance with the present invention, a circuit is provided which is responsive to a train of input signals, comprising a monostable multivibrator having a stable state, an unstable state, and a natural timing period during which the multivibrator normally remains in the unstable state after being actuated thereto by an input signal. An output pulse is provided by the multivibrator when it is in its stable state, and the multivibrator is connected to be actuated to the unstable state by each of the input signals. During operation, when the natural timing period of the multivibrator is less than the time duration between adjacent input signals, the multivibrator will be actuated to its unstable state by each input signal but it will also be in its stable state for a portion of each cycle, and consequently an output pulse having a finite width and amplitude is provided by the multivibrator. However, when the natural timing period of the multivibrator is greater than the time duration between adjacent input signals, the multivibrator is continuously maintained in its unstable state because, after it has been actuated to the unstable state by an input signal, a subsequent input signal is received by the multivibrator before it has had time to revert to its stable state. Therefore in the latter instance the output pulse of the multivibrator has a zero width and amplitude.

At the frequency where the time duration between input signals is equal to the natural timing period of the multivibrator, the output pulse width drops to zero, and this frequency is referred to herein as the critical frequency. To vary this critical frequency the multivibrator further includes means for varying the natural timing period of the multivibrator.

The output signal of the multivibrator may be filtered to provide a DC output signal having an amplitude which is proportional to input signal frequency when operating below the critical frequency. In addition, a voltage threshold circuit may be connected to receive any filtered output signal and to energize an actuator only when its amplitude is above a predetermined voltage threshold level.

Other objects and advantages of the invention will become apparent from the following description taken in conjunction with the accompanying figures of the drawings in which.

Figure 1:
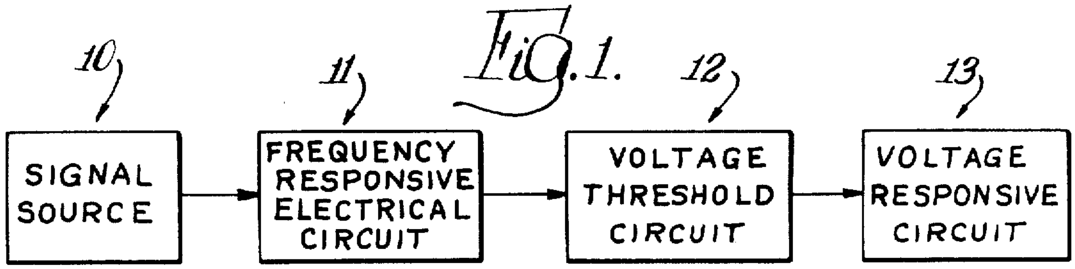
FIG. 1 is a block diagram of a system including circuits embodying the invention.

In greater detail, FIG. 1 illustrates a system including a signal source 10 adapted to provide a train of input signals, such as square wave signals, a frequency responsive electrical circuit 11 connected to receive the input signals, a voltage threshold circuit 12 connected to receive the output of the circuit 11, and a voltage responsive circuit 13 connected to receive the output of the voltage threshold circuit 12.

Figure 2:
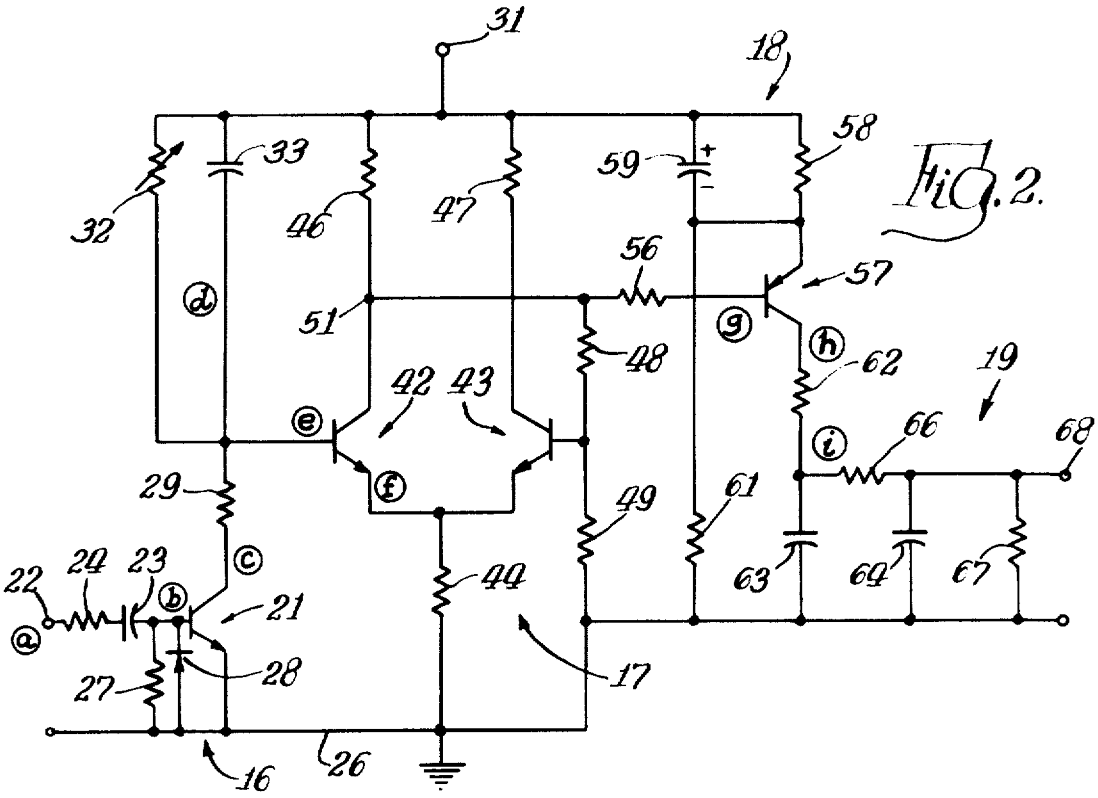
FIG. 2 is a schematic electrical diagram of a circuit embodying the invention.
Figure 3:
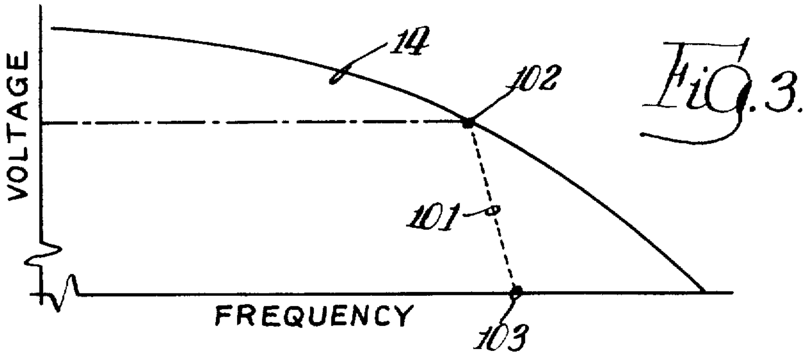
FIG. 3 shows a curve illustrating the operation of the system shown in FIG. 1.
Figure 4:
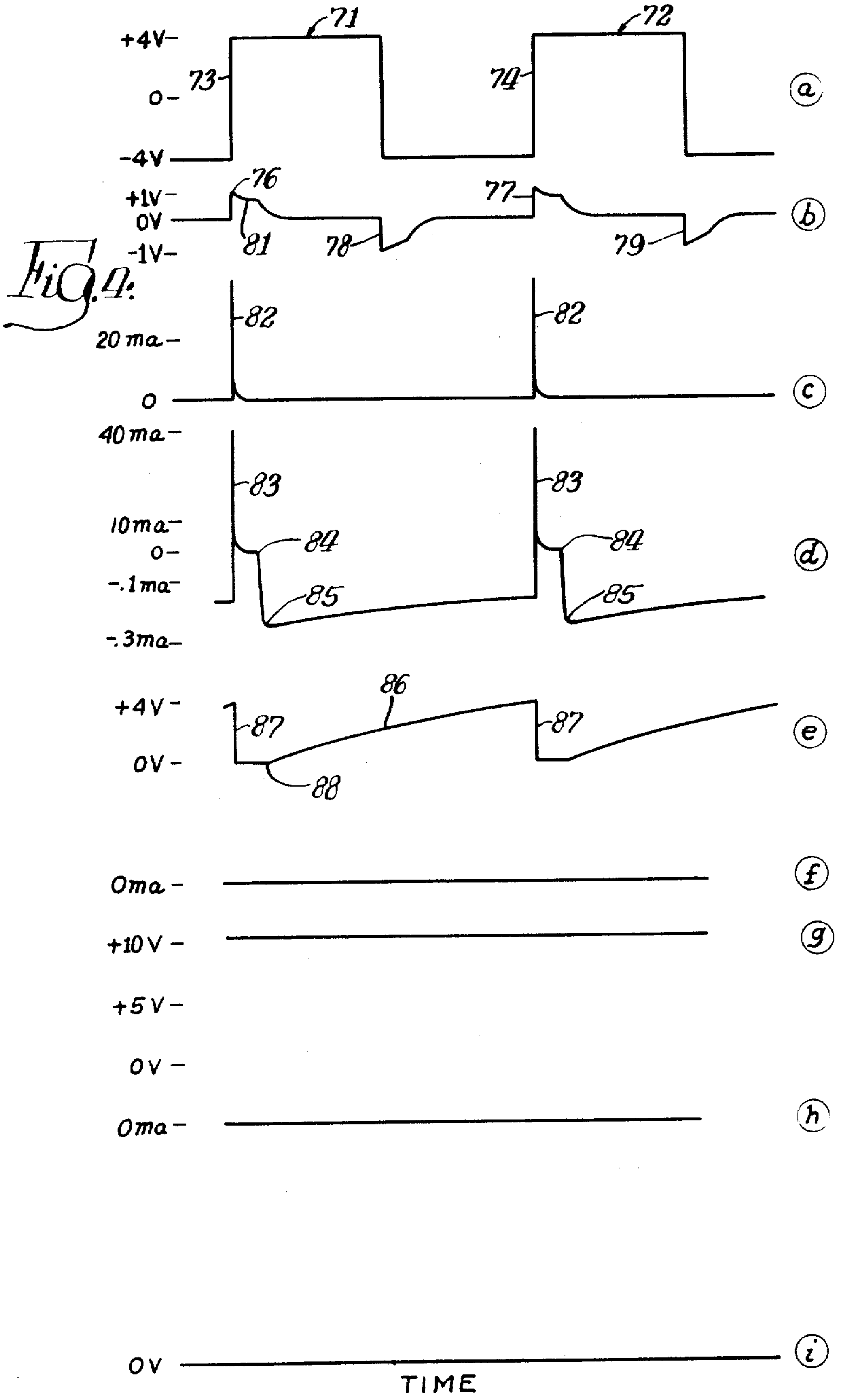
FIG. 4 and 5 show waveforms illustrating the operation of the circuit shown in FIG. 2.
Figure 5:
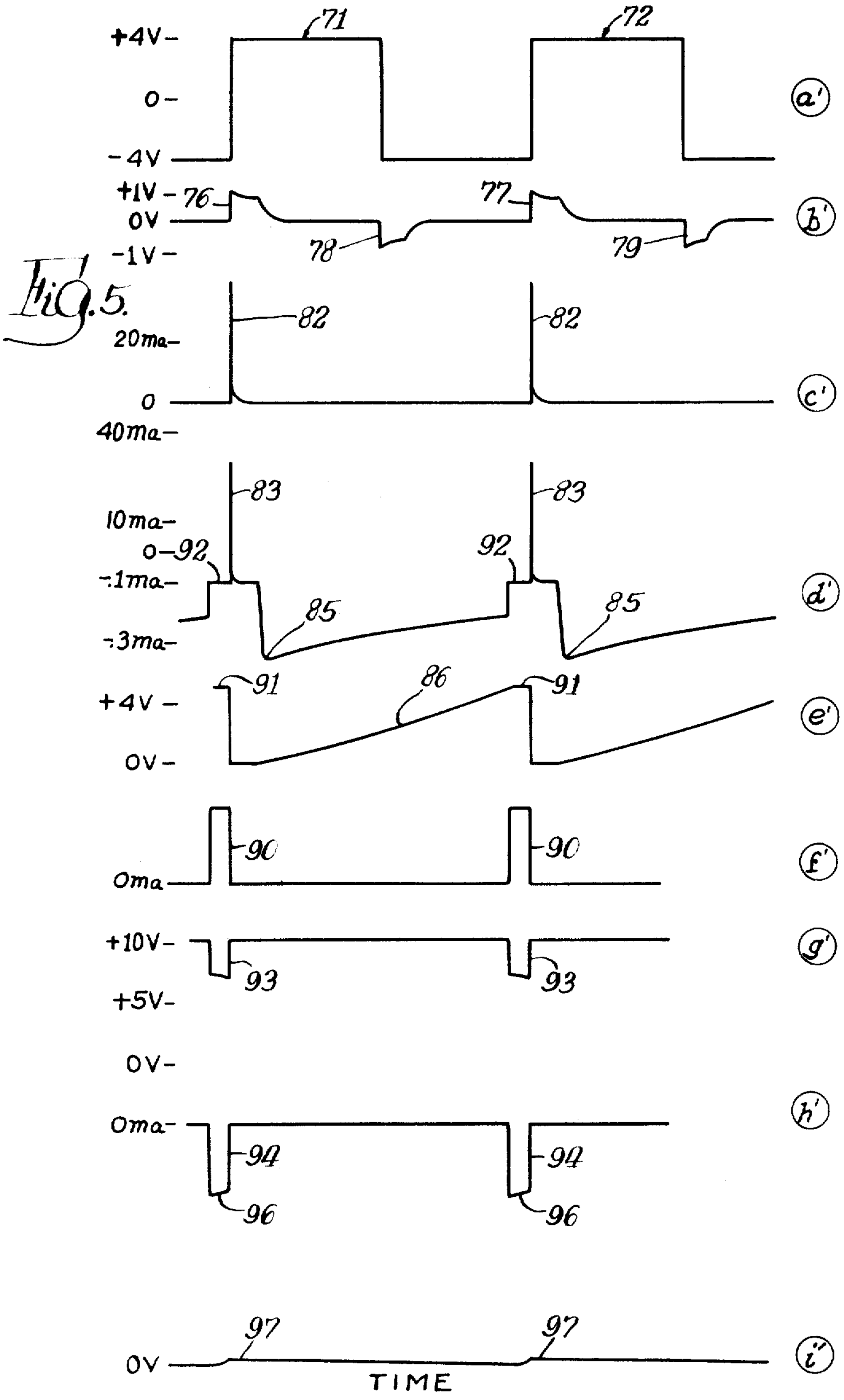

The frequency responsive electrical circuit 11 is shown in detail in FIG. 2, and the solid line curve 14 in FIG. 3 illustrates the output voltage versus input signal frequency characteristic of the circuit 11. To further illustrate the operation of the circuit shown in FIG. 2, the waveforms in FIGS. 4 and 5 illustrate the current and the voltage at selected points *a* through *i* of this circuit.

The frequency responsive circuit 11 shown in detail in FIG. 2 comprises a reset amplifier 16, a monostable multivibrator 17, a direct current amplifier 18, and a low pass filter 19. The reset amplifier 16 includes an NPN transistor 21 which has its base connected to an input terminal 22 through a capacitor 23 and a resistor 24. The emitter of the transistor 21 is connected to ground line 26, and a resistor 27 and a rectifier 28 are connected in parallel between the base of the transistor 21 and the ground line 26. The collector of the transistor 21 is connected through a resistor 29 to trigger or actuate the multivibrator 17. As will be explained in greater detail hereinafter with reference to FIGS. 4 and 5, the positive going edge, which in the present instance is the leading edge, of a square wave signal at the input terminal 22 results in a relatively short duration positive going pulse on the base of the transistor 21. The transistor 21 is normally biased off but such a positive pulse momentarily drives the transistor 21 into saturation.

The monostable multivibrator 17 includes two NPN transistors 42 and 43 which have their emitters connected together and to a resistor 44, the other side of the resistor 44 being connected to the ground line 26. The base of the transistor 42 is connected to the resistor 29 and also to one side of a parallel combination of a capacitor 33 and a variable resistor 32, the other side of this parallel combination being connected to a positive potential terminal 31. The collectors of the transistors 42 and 43 are connected to the positive terminal 31 through resistors 46 and 47, respectively. The base of the transistor 43 is connected to a voltage divider network including the resistor 46 and two other resistors 48 and 49, the three resistors 46, 48 and 49 connected in series between the positive potential terminal 31 and the ground line 26, and the base of the transistor 43 being connected to the juncture of the two transistors 48 and 49. The output signal of the monostable multivibrator 17 is taken at a terminal 51 connected to the collector of the transistor 42, the terminal 51 also being connected to the juncture of the two resistors 46 and 48.

When the multivibrator 17 is in its stable state, the transistor 42 of the multivibrator 17 is conducting and the transistor 43 is non-conducting, and the voltage at the terminal 51 is relatively low. Briefly, each time the transistor 21 is driven to saturation by an input signal on the terminal 22, the multivibrator 17 is triggered to its unstable state where it remains until the end of its natural timing period when it reverts to its stable state, unless a subsequent input signal is received before the end of the natural timing period. When in its unstable state, the output signal appearing at the junction 51 is relatively high, and when in its stable state, the output signal is relatively low.

The junction 51 is connected through a resistor 56 to the base of a PNP transistor 57 of the DC amplifier 18. The emitter of the transistor 57 is connected to the positive potential terminal 31 through the parallel combination of a resistor 58 and a capacitor 59, and the emitter of the transistor 57 is also connected to the ground line 26 through a resistor 61. Thus, the voltage on the emitter of the transistor 57 is determined by a voltage divider network consisting of the resistors 58 and 61. The collector of the transistor 57 is connected to the low pass filter 19 through a resistor 62, the filter 19 comprising two capacitors 63 and 64 and two resistors 66 and 67. The two capacitors 63 and 64 and the resistor 67 are connected in parallel branches between the ground line 26 and the resistor 62, and the other resistor 66 is connected between the two capacitors 63 and 64. The filtered output signal is taken across the resistor 67, between an output terminal 68 and the ground line 26.

The following are typical values for the components included in the circuit shown in FIG. 2: the supply voltage at the terminal 31 is +12 volts DC; the transistors 21, 42 and 43 are NPN transistors and the transistor 57 is a PNP transistor; the resistance of the resistors 24 and 27 is 10K ohms, the resistance of the resistor 29 is 100 ohms, the resistance of the resistor 32 is variable between 5 and 50K ohms, the resistance of the resistor 44 is 1.5K ohms, the resistance of the resistors 46 and 47 is 3.3K ohms, the resistance of the resistors 48, 49 and 56 is 10K ohms, the resistance of the resistor 58 is 1,000 ohms, the resistance of the resistor 61 is 2.2K ohms, the resistance of the resistors 62 and 66 is 1,000 ohms, and the resistance of the resistor 67 is 4.7K ohms; the capacitance of a capacitor 23 is 0.0033 $\mu f$, the capacitance of a capacitor 33 is 0.1 $\mu f$, and the capacitance of the capacitors 59, 63 and 64 is 15 $\mu f$.

The waveforms *a* through i shown in FIG. 4 illustrate the operation of the circuit shown in FIG. 2 when the natural timing period of the multivibrator 17 is longer than the time duration between adjacent input pulses fed to the terminal 22. In this instance, the monostable multivibrator 17 is continuously in its unstable state and therefore no output signal is provided. The wave forms *a'* through *i'* shown in FIG. 5 illustrate the operation of the circuit when the natural timing period of the multivibrator 17 is less than the time duration between adjacent input pulses, and in this instance the multivibrator 17 reverts to its stable state for at least a portion of each cycle, and, consequently, an output signal is provided.

With reference to FIG. 4, the waveform *a* illustrates the input signals fed to the terminal 22, two such adjacent signals being shown and indicated generally by the numerals 71 and 72. The magnitude of the input signals 71 and 72 is relatively unimportant so long as they are sufficiently large to saturate the transistor 21 on the positive rise, or leading edge, portion of each signal. In waveform *a*, the numerals 73 and 74 indicate the leading edges of the signals 71 and 72, respectively, and the time duration between the portions 73 and 74 is, in the present illustration, 0.005 second.

Due to the capacitor 23 and the resistor 24, positive voltage pulses 76 and 77 appear on the base of the transistor 21 at the time of the leading edges 73 and 74, and negative going pulses 78 and 79 appear at the time of the following edges of the signals 71 and 72. The transistor 21 is normally biased off, and consequently the collector current of the transistor 21 is normally zero (waveform *c*). The positive going pulses 76 and 77 bias the transistor 21 to saturation, thereby causing current to flow from the positive terminal 31 through the capacitor 33, the resistor 29 and the transistor 21 to the ground line 26. The negative going pulses 78 and 79 simply bias the transistor 21 farther off, and the diode 28 is preferably provided to protect the base-emitter junction of the transistor 21 from possible damage from an excessively high negative voltage peak.

As stated, each of the pulses 76 and 77 biases the transistor 21 to saturation, the sloped portion 81 of each of the two pulses 76 and 77 being curved due to the exponentially decreasing base current applied to the base-emitter junction of the transistor 21. In the present illustration, the transistor 21 is biased to saturation for approximately the first 0.0004 second, the bias voltage after this period of time not being sufficient to overcome the base-emitter threshold of transistor 21. The only requirement placed on this initial time period is that it be longer than the time required for the capacitor 33 to become fully charged through the resistor 29 and the transistor 21, and from waveform *c*, it can be seen that this time period is easily sufficient for this purpose. The waveform *c* represents the current through the collector of the transistor 21. When the transistor 21 is first biased to conduction, the current flow is relatively large as indicated by the peaks 82, but this current falls rapidly to substantially zero as the capacitor 33 becomes fully charged. From a comparison of waveforms *b* and *c* it can be seen that the transistor 21 is saturated for a length of time easily sufficient to fully charge capacitor 33.

Waveform *d* represents the charging and discharging currents through the capacitor 33. The peaks 83 in waveform *d* occur when the transistor 21 first conducts and the capacitor 33 is being charged. After the capacitor 33 is fully charged, the current drops to zero, and at the point 84 in waveform *d*, the transistor 21 stops conducting and the current through capacitor 33 reverses as the capacitor begins to discharge through the variable resistor 32. It should be noted that the positive portion of the current scale for waveform *d* differs from the negative portion of this scale. The discharge current through capacitor 33 and resistor 32 is relatively large at first, in the area indicated by the numeral 85, and then the current flow gradually decreases toward zero.

When the monostable multivibrator 17 is in its stable state, the transistor 42 is conducting, the transistor 43 is non-conducting, and the voltage at the junction 51 is relatively low. The multivibrator 17 is triggered to its unstable state, where the transistor 42 is non-conducting, each time the transistor 21 conducts. Waveform *e* represents the voltage appearing on the base of the transistor 42. At the instant the transistor 21 is biased to saturation, the voltage on the base of the transistor 42 drops to substantially zero volts as indicated at 87, and this voltage is maintained until the transistor 21 ceases to conduct and the capacitor 33 starts to discharge. At this point, indicated by the numeral 88, the timing period of the multivibrator begins. Thereafter, the gradual discharge of the capacitor 33 through the variable resistor 32 causes the voltage on the base electrode of the transistor 42 to gradually rise as indicated at 86 in waveform *e*.

The bias on the transistor 42, in the present circuit, is such that it begins to conduct, and the multivibrator reverts to its stable state, when the voltage on the base of the transistor 42 reaches approximately positive 4.5 volts. In the operation of the circuit illustrated by the waveforms in FIG. 4, the time constant of the capacitor 33 and the variable resistor 32 is such that the voltage on the base of the transistor 42 does not reach the 4.5 volt level before the leading edge 74 of the next subsequent signal 72 arrives. Upon the arrival of the next input signal, the voltage on the base of the transistor 42 again drops to substantially zero, and the multivibrator 17 is thus maintained in its unstable state.

Waveform *f* illustrates the current through the transistor 42, which is zero because the transistor 42 is maintained cut-off. Waveform *g* illustrates the voltage on the base of the transistor 57, which is approximately a constant 10.2 volts DC and which is determined by the voltage divider network consisting of the resistors 46, 48 and 49. This voltage biases off the transistor 57 and, consequently, the collector current of the transistor 57 is zero, as illustrated by waveform *h*. With no current flowing through the transistor 57, the voltage across the low pass filter 19 is zero (waveform *i*) and the voltage at the output terminal 68 is also zero.

For the purpose of the present application, the natural timing period of the multivibrator 17 is defined as the length of time from the positive rise portion of an input signal 73 until the voltage on the base of the transistor 42 rises to 4.5 volts and the multivibrator reverts to its stable state. The natural timing period is determined by the rate of discharge of the capacitor 33 which in turn is determined by the value of the resistor 32. Thus, the natural timing period may be varied by adjusting the resistor 32.

FIG. 5 illustrates the operation of the circuit shown in FIG. 2 when the natural timing period of the monostable multivibrator 17 is less than the time duration between the positive rise portions of adjacent incoming signals at the input terminal 22. The time duration between adjacent input signals is the same as in the FIG. 4 illustration, but the resistor 32 is adjusted to a lower value in order to reduce the length of the natural timing period. The voltage and current waveforms at the input terminal 22 and the base and collector electrodes of the transistor 21, as represented by waveforms *a'*, *b'* and *c'* in FIG. 5, are identical with the corresponding waveforms shown in FIG. 4. Due to the lower value of the resistor 32, the capacitor 33 discharges more rapidly, and the capacitor 33 discharges sufficiently for the voltage, as represented by waveform *e'* in FIG. 5, on the base of transistor 42 to rise to the 4.5 volt switch on level. At this voltage, the transistor 42 starts to conduct and the monostable multivibrator 17 reverts to its stable state. The voltage on the base of the transistor 42 reaches the 4.5 volt level approximately 0.003 second before the arrival of the next input signal. Consequently, as shown by the pulses 90 of waveform *f'*, the monostable multivibrator 17 is in its stable state for approximately 0.003 seconds before the next input signal triggers the multivibrator to its unstable state. The amplitude of the pulses 90 is substantially constant since the transistor 42 is either biased to saturation or it is biased off. During the time that the monostable multivibrator 17 is in its stable state and the transistor 42 is conducting, the voltage on the base of the transistor 42 is substantially constant, as indicated by the portion 91 of waveform $e'$ and since this base voltage is substantially constant, the current through the capacitor 33 is zero, as indicated by the portion 92 of current waveform $d'$ in FIG. 5.

When the transistor 42 is biased to saturation, the voltage at the junction 51 drops and a negative going voltage pulse 93 (waveform $g'$) appears on the base of the transistor 57 and biases the transistor 57 to saturation. The voltage on the base electrode of the transistor 57 is normally about 10.2 volts, as determined by the voltage divider network of resistors 46, 48 and 49. The emitter of transistor 57 is at 8.3 volts, as determined by the resistors 58 and 61, and, hence, the transistor 57 is normally biased off. Waveform $h'$ shows the collector current of transistor 57, the current including pulses 94 which occur when the transistor 57 is saturated. The droop in the current at the portions 96 of the pulses is due to charging of the filter capacitor 63. Waveform $i'$ shows the voltage at the junction of the capacitor 63 and the resistor 66, this voltage including ripples 97 which occur at the time of the voltage pulses 93 and 94. At the output terminal 68, the ripples 97 are substantially eliminated by the filter network 19.

The length of time in each cycle during which the transistor 21 is saturated depends upon the time constant of the resistor 24 and the capacitor 23, and this time constant is chosen so that it is long enough for the capacitor 33 to fully charge. The length of the natural timing period of the monostable multivibrator is determined by the time constant of the capacitor 33 and the variable resistor 32, and the resistance of the resistor 32 is adjustable so that the timing period may be varied.

The average collector current of transistor 57 is proportional to the width of the output pulses at the terminal 51, and this relationship may be written as $$I = K(t_1 - t_2)$$

where $I$ is the collector current of the transistor 57, $t_1$ is the natural timing period of the monostable multivibrator, $t_2$ is the time duration between the leading edges of adjacent input signals, and $K$ is a constant.

As previously stated $t_1$ is related to the setting of the variable resistor 32, and the value of the constant $K$ is related to the values of the resistors 58, 62.

At a given setting of the variable resistor 32 the width of the multivibrator output pulses decreases with increasing frequency. At a given frequency, this output pulse width increases when decreasing the natural timing period (decreasing value of resistor 32). In either case, the output pulse amplitude is substantially constant. The multivibrator output pulses are amplified and then filtered to produce the solid line curve 14 in FIG. 3. With reference to the curve shown in FIG. 3, it will be apparent that the voltage at the output terminal 68 gradually drops as the frequency of the input signals increases due to the decreasing length of time in each cycle during which the monostable multivibrator is in its stable state.

The voltage threshold circuit 12 operates such that its output voltage has a predetermined value for all inputs above a predetermined input voltage threshold level and a lower voltage output for input voltages below the predetermined voltage threshold level. With reference to FIG. 3, the dashed line 101 indicates the operating characteristic of the circuit 12, and it will be apparent that when the voltage of the output signal from the circuit 11 is greater than the voltage at the point indicated by the numeral 102, the output from the circuit 12 will be at a substantially maximum value and it drops along the line 101 to zero at the point 103. The voltage at the point 102 and the slope of the line 101 between the points 102 and 103 may be varied by changing the value of the resistor 62 of the circuit shown in FIG. 2 in order to change the amount of current flowing through the transistor 57. Practical values for the resistor 62 range from 100 ohms to 10K ohms, providing a possible range of slopes of over 100 to 1. The slope of the line 101 between the points 102 and 103 may also be adjusted by changing the input sensitivity of the threshold circuit 12.

The DC responsive circuit 13 may comprise, for example, a DC responsive motor, solenoid, switch, etc. In an installation including a solenoid, the slope of the curve 101 is preferably made as steep as possible so that the relay will be energized at frequencies less than the frequency of the point 102 and deenergized at frequencies above this value. Such a frequency responsive solenoid or switch may be used, for example, as an overspeed sensing circuit where the speed of a mechanism is sensed and is proportional to the frequency of the input signals fed to the input terminal 22. The circuit shown in FIG. 2 could also be used in a closed loop speed control system wherein the signal source 10 senses the speed of an engine or motor which is required to have its speed controlled, and the DC responsive circuit 13 comprises a mechanism which is designed to vary the speed of the engine or motor. In such a system, the setting of the resistor 32 of the circuit shown in FIG. 2 may be set to a desired speed and the system would then maintain the engine or motor of the source 10 at the desired speed.

Figure 6:
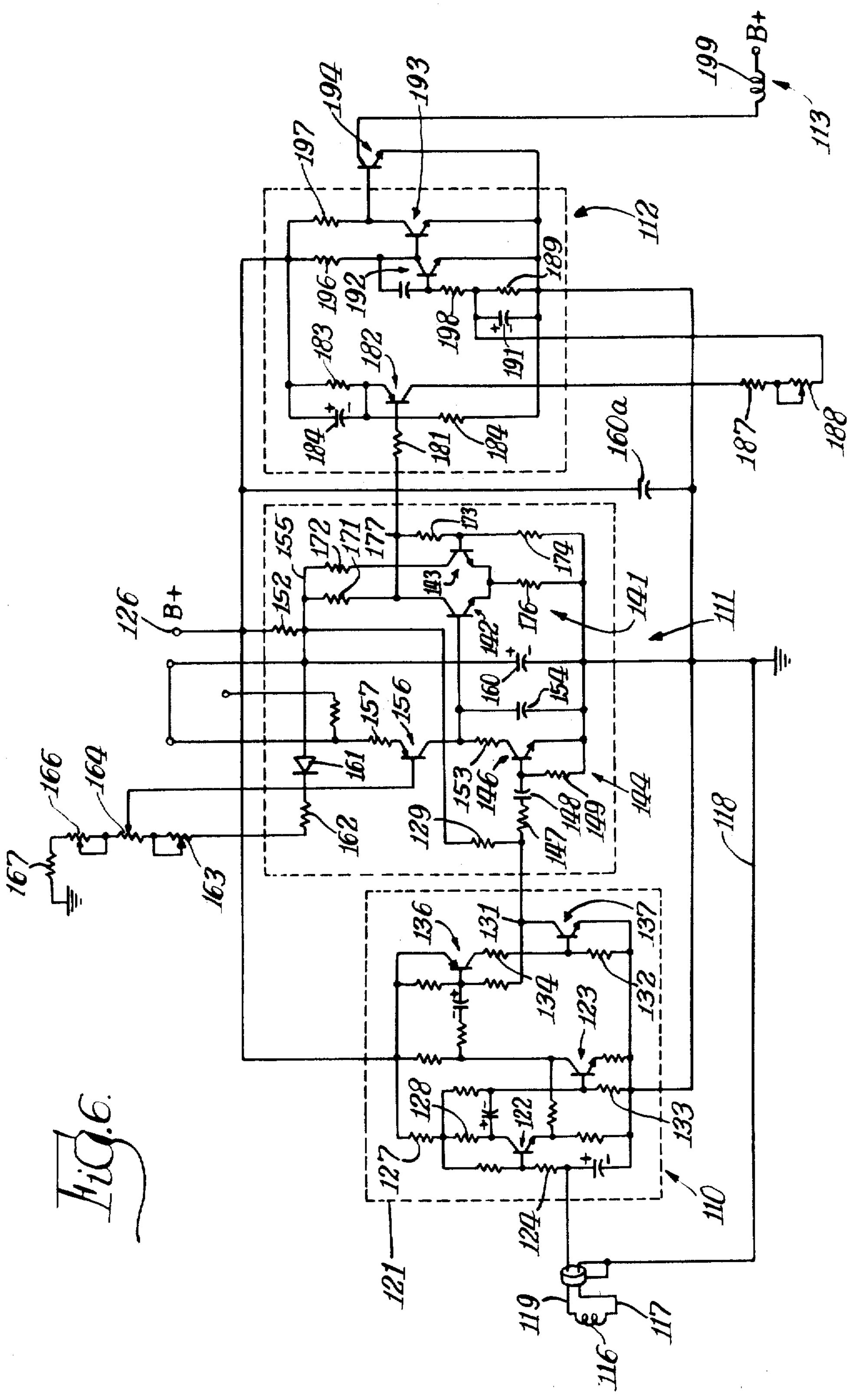
FIGS. 6 to 8 are schematic electrical diagrams of systems embodying the invention.

FIG. 6 illustrates a system as shown in FIG. 1 including an alternate form of the frequency responsive circuit 11. With reference to FIG. 6, the signal source of the system is indicated by the numeral 110, the frequency responsive circuit is indicated by the numeral 111, the voltage threshold circuit is indicated by the numeral 112, and an actuator circuit is indicated by the numeral 113.

The signal source 110 comprises a pick-up coil 116 which has one end 117 connected to ground line 118 and its other end 119 connected to a square wave generator and amplifier circuit 121. The pick-up coil 116, when positioned adjacent a moving magnetic member such as a tooth on a rotating toothed wheel, has a voltage induced therein due to movement of the member past the pick-up coil 116, and the signal induced in the coil 116 has a generally sinusoidal configuration.

The square wave generator and amplifier circuit 121 is designed to convert a sinusoidal signal into a square wave and also to amplify the signal. The circuit 121 comprises two NPN transistors 122 and 123, the transistor 122 having its base connected through a resistor 124 to the end 119 of the coil 116. The collector of the transistor 122 is connected to a B+ terminal 126 through a series connection of a pair of resistors 127 and 128. The emitter of the transistor 122 is connected both to the ground line 118 and to the collector of a transistor 123, and the collector of the transistor 122 is connected to the base of the transistor 123. The emitter of the transistor 123 is also connected to the ground terminal 118 and the collector of the transistor 123 is connected to the positive potential terminal 126. A resistor 133 is connected between the base of the transistor 123 and the ground line 118.

The voltage induced in the pick-up coil 116 is amplified by the circuits including the two transistors 122 and 123, and the amplified sine wave signal is passed to the base of the transistor 136. The emitter of the transistor 136 is connected to the positive terminal 126 and its collector is connected to the base of the transistor 137 through a capacitor 134. The base of the transistor 137 is connected to the ground line 118 through a resistor 132, its emitter is connected directly to the ground line, and its collector is connected to an output terminal 131. The collector of the transistor 137 is also connected to the positive terminal through a resistor 129.

In the operation of the circuit 110, the circuits including the two transistors 122 and 123 amplify the incoming signals from the pick-up coil 116, and the circuit including the two transistors 136 and 137 converts the sine wave signals to a train of square waves having very short rise and fall times, the square waves appearing at the terminal 131.

The circuit 111 comprises a monostable multivibrator 141, similar to the multivibrator 17 in FIG. 2, including two NPN transistors 142 and 143. The circuit 111 further comprises a reset amplifier 144 including another NPN transistor 146. The square wave signals from the circuit 121 are received at the base of the transistor 146 through a resistor 147 and a capacitor 148, the base of the transistor 146 also being connected through a resistor 149 to the ground line 118. The transistor 146, capacitor 148 and resistor 149 correspond respectively to the resistor 24, capacitor 23 and resistor 27 in FIG. 2, and serve to differentiate the incoming square waves. Thus, the leading edge of each positive going square wave produces a positive pulse on the base of the transistor 146 and the following edge of each square wave produces a negative going pulse on the base of the transistor 146.

The collector of the transistor 146 is connected to a resistor 153, and a capacitor 154 is connected from the resistor 153 to the ground line 118. The transistor 146 is normally biased off, but it is biased on by each incoming positive going pulse, which, as previously stated, occurs at the leading edge of each incoming square wave. When the transistor 146 is biased to saturation, the capacitor 154 is shorted and therefore any charge existing on the capacitor 154 is discharged through the resistor 153 and the transistor 146. On the other hand, when the transistor 146 is biased off, the capacitor 154 is charged through another transistor 156 and a resistor 157, which is connected to a positive potential line 155. The line 155 is connected through a resistor 152 to the positive terminal 126, the resistor 152 acting in conjunction with a pair of caoacitors 160 and 160*a* to decouple the circuit 111 from the power supply and remove any AC components in the supply. When the transistor 146 is biased off, current flows from the positive potential line 155 through the resistor 157, through the transistor 156 which is normally conducting, and through the capacitor 154 to ground.

The rate at which the capacitor 154 is charged depends upon the bias on the transistor 156, and this bias is in turn determined by a voltage divider network including a diode 161, a fixed resistor 162, a variable trimmer resistor 163, a potentiometer 164, a second variable trimmer resistor 166, and a fixed resistor 167, the latter resistor 167 being further connected to ground. The slider of the potentiometer 164 is connected directly to the base of the transistor 156, and it will be apparent that the setting of the potentiometer 164 determines the voltage on the base of the transistor 156. The variable resistor 163 is preferably lower in magnitude than the variable resistor 166 and the resistor 163 may be used to trim the lower voltage limit while the variable resistor 166 may be used to trim the upper voltage limit.

The base of the transistor 142 of the monostable multivibrator 141 is connected to the capacitor 154 and the voltage on the base is, therefore, dependent upon the charge on the capacitor 154. The collectors of the two transistors 142 and 143 are respectively connected to the resistor 152 through resistors 171 and 172, and the collector of the transistor 142 is also connected to the ground line 118 through the series connection of a pair of resistors 173 and 174, and to an output terminal 177. The base of the transistor 143 is connected to the juncture of the two resistors 173 and 174, and the emitters of the two transistors 142 and 143 are connected to the ground line 118 through a resistor 176. The foregoing connections are of course generally similar to the connections to the monostable multivibrator 17 in FIG. 2.

When in its stable state, the transistor 142 of the monostable multivibrator 141 is biased on by the voltage on the capacitor 154, and the transistor 143 is biased off. When a positive pulse is received on the base of the transistor 146, it is momentarily biased to saturation and during this time the capacitor 154 discharges through the resistor 153 and the transistor 146. With the capacitor 154 discharged, the voltage on the base of the transistor 142 drops and the monostable multivibrator 141 shifts to its unstable state where the transistor 142 is biased off and the transistor 143 is biased on. Further, the potential at the output terminal 177 at this time is relatively high.

A positive pulse received at the base of the transistor 146 has a relatively short time duration, and as soon as it passes the transistor 146 is once again biased off. With the transistor 146 biased off, the capacitor 154 is again charged through the transistor 156 and the resistors 157 and 152, and the rate at which the capacitor 154 is charged depends on the bias on the base of the transistor 156, which, as previously stated, is determined by the setting of the potentiometer 164. As the capacitor 154 charges up, the potential across it and on the base of the transistor 142 gradually increases. If this potential rises to the switch on level of the transistor 142 it will again be biased to conduction and the monostable multivibrator 141 will shift to its stable state. When in its stable state, the potential at the output terminal 177 drops below the potential which existed when the monostable multivibrator was in its unstable state, with the result that a negative going voltage pulse appears at the terminal 177 whenever the monostable multivibrator 141 is in its stable state.

If the capacitor 154 is not charged up sufficiently for the potential on the transistor 142 to reach its switch on potential, the monostable multivibrator will remain in its unstable state. Thus, if the leading edge of the next subsequent square wave arrives before the switch on potential is reached, the capacitor 154 will be discharged through the transistor 146 and a new cycle will begin without the transistor 142 ever having been biased on. It will be apparent that, when the time interval between the leading edges of adjacent square waves is less than the time required for the capacitor 154 to charge to the switch on potential of the transistor 142, the transistors 142 will be held cut-off and the monostable multivibrator 141 will be continuously in its unstable state. On the other hand, when the time interval between the leading edges of adjacent square waves is greater than the time required for the capacitor 154 to charge to the foregoing level, the monostable multivibrator 141 will, for at least a portion of each cycle, be in its stable state and a negative going output pulse will appear at the output terminal 177. The width or time duration of each negative going output pulse therefore is equal to the time between the leading edges of adjacent square wave signals minus the time required for the capacitor 154 to charge to the switch on potential of the transistor 142. Thus, the circuit 111, similar to the portion 17 of the circuit shown in FIG. 2, serves as a frequency-to-pulse-width converter circuit when operating at a frequency below the critical frequency of the input signals, which critical frequency may be defined as the frequency where the time between the leading edges of adjacent square waves is equal to the time required for the capacitor 154 to charge to the switch on potential of transistor 142. Above this critical frequency, the width of the output signals is zero and consequently the output signal at the terminal 177 equals zero, and below this critical frequency the time duration of the output signals appearing at the terminal 177 is related to the frequency of the input signals induced in the pick-up coil 116. The value of this critical frequency may be varied by adjusting the setting of the potentiometer 164, such adjustment changing the bias on the transistor 156 and the rate at which the capacitor 154 is charged up. It will be apparent that, if the capacitor 154 charges rapidly, the charge may reach the switch on bias of the transistor 142, which, if it charges slowly, it may not reach this bias before the next input signal arrives.

The circuit 112 includes a fixed resistor 181 which is connected between output terminal 177 of the circuit 111 and the base of a PNP transistor 182. The emitter of the transistor 182 is connected to the positive potential terminal 126 through a resistor 183 and a capacitor 184, the resistor 183 and the capacitor 184 being connected in parallel. The juncture of the resistor 183 and the capacitor 184 is also connected to the ground line 118 through still another resistor 184, the circuit including the transistor 182 thus forming a buffer amplifier which amplifies the variable width pluses received from the circuit 111. The transistor 182 is normally biased off but a negative going pulse from the terminal 177 biases on the transistor 182, causing current to flow from the positive potential terminal 126, through the resistor 183, the transistor 182, a fixed resistor 187, a variable resistor 188, the parallel combination of a capacitor 191 and a fixed resistor 189 and to the ground line 118. The capacitor 191 serves to smooth the voltage pulses which occur when the transistor 182 conducts. When operating below the critical frequency, the voltage appearing across the capacitor 191 is a series of capacitor charge and discharge curves with a DC component above ground, the magnitude of the DC component depending upon the area under the pulses received from the circuit 111, the magnitude of the adjustable resistor 188, and the magnitude of the resistor 189. Since the variable resistor 188 is connected in series with the transistor 182 and the capacitor 191, it serves as an effective amplifier gain control.

The remainder of the circuit 112 includes three NPN transistors 192,193 and 194. The emitter of each of these three transistors is connected directly to the ground line 118, the collector of the transistor 192 is connected to the positive potential terminal through a resistor 196, and the collector of the transistor 193 is connected to the positive potential terminal through another resistor 197. The base of the transistor 192 is connected to the capacitor 191 through a resistor 198, the base of the transistor 193 is connected to the collector of the transistor 192, and the base of the transistor 194 is connected to the collector of the transistor 193. The transistor 194 has its collector connected to one side of the winding 199 of a solenoid actuated mechanism, the other side of the winding 199 being connected to the positive potential terminal 126.

In operation if the frequency of the signals induced in the pick-up coil 116 is above the critical frequency of the circuit 111, no signals will appear at the output terminal 177 and the winding 199 is not energized. However, if the input signal frequency induced in the coil 116 is below the critical frequency, negative going pulses appear at the output terminal 177 and are amplified by the amplifier 182. In such event, positive going pulses will appear across the resistor 189, and a ripple voltage will appear across the capacitor 191. If the peaks of the ripple voltage of the signal appearing across the capacitor 191 are sufficiently high, the transistor 192 will be switched on by each peak. Assuming that the peaks of the ripple voltage rise to the point where the transistor 192 is switched on, the length of time that it is on depends upon the width of the signals being received from the circuit 111. Further, when the width of these pulses is great enough, the DC level across the capacitor 191 will be sufficiently high that the transistor 192 will be switched on continuously.

With reference again to FIG. 3, the point 102 on the curve 14 indicates the frequency at which the ripple voltage across the capacitor 191 just begins to drop below the switch on voltage of the transistor 192. The point 103 in FIG. 3 indicates the frequency at which the peaks of the ripple voltage appearing across the capacitor 191 rise just high enough to bias on the transistor 192 for a portion of each cycle. A proportional action, in the portion 101 of the curve between the points 102 and 103 thus occurs because the transistor 192 is switched on for varying percentage of the time. At frequencies above the point 103, the ripple voltage at no time rises to the switch on bias of the transistor 192.

If the value of the resistor 189 were increased, the swing of the ripple across the capacitor 191 would also be increased, and, consequently a greater value of the DC level across the capacitor 191 would be required to switch the transistor 192 on and off for the same time duration as when the resistor 189 is lower. Thus, lowering the value of the resistor 189 increases the gain of the circuit 112. It is also possible to lower the gain of circuit 112 by lowering the value of the capacitor 191, but some difficulty may be encountered by such a change because excessive lowering of the magnitude of the capacitor 191 could lead to problems arising from the fact that it may not be possible to switch the transistor 192 completely on.

When the transistor 192 is biased on, the transistors 193 and 194 also conduct, and current flows through the winding 199 of the actuator 113.

To summarize the operation of the system in FIG. 6, generally sinusoidal signals are induced in the pick-up coil 116 and the sinusoidal signals are converted to a square wave and are amplified by the circuit including the transistors 122, 123, 136 and 137. The capacitor 148 and resistor 149 convert the square waves into a series of positive and negative going voltage pulses. The positive going voltage pulses periodically switch on the transistor 146, and when this transistor 146 is on, the capacitor 154 is discharged through it and the resistor 153. When the transistor 146 is biased off, the capacitor 154 is gradually charged by current flowing from the positive potential terminal 126, through the resistors 152 and 157, the transistor 156 and the capacitor 154 to the ground line 118. The rate at which the capacitor 154 charges depends upon the settings of the three resistors 163, 164 and 166 since these three resistors determine the bias on the transistor 156. As the charge on the capacitor 154 gradually increases, voltage on the base of the transistor 142 also gradually increases. If the time duration between adjacent input signals induced in the coil 116 is longer than the time duration required for the charge across the capacitor 154 to bias the transistor 142 on, the multivibrator 141 switches to its stable state and a negative going pulse appears at the output terminal 177. If the time duration between adjacent input signals is less than the time required for the voltage across the capacitor 154 to reach the switch on bias of the transistor 142, the transistor 142 is continuously maintained off and a signal does not appear at the terminal 177.

Assuming that the frequency of the input signals is below the aforementioned critical frequency, negative going voltage pulses appearing on the terminal 177 bias the buffer amplifier 182 on for varying lengths of time. The duration of each pulse depends on the differential between the input signal spacing and the time required for the voltage across the capacitor 154 to reach the switch on voltage of the transistor 142. Conduction of the transistor 182 results in positive voltage pulses appearing across the resistor 189 and the capacitor 191. Depending upon the time duration of these pulses, the values of the capacitor 191 and the resistor 189, the transistors 192, 193 and 194 are switched on for varying lengths of time and energize the actuator 113. If the input frequency is below the point 102, the actuator 113 is continuously energized, if the input frequency is above the point 103, the actuator is not energized, and if the input frequency is between the points 102 and 103, the actuator 113 is partially energized. As previously stated, the frequencies of the points 102 and 103 and the critical frequency may be adjusted using the potentiometer 164.

Figure 7:
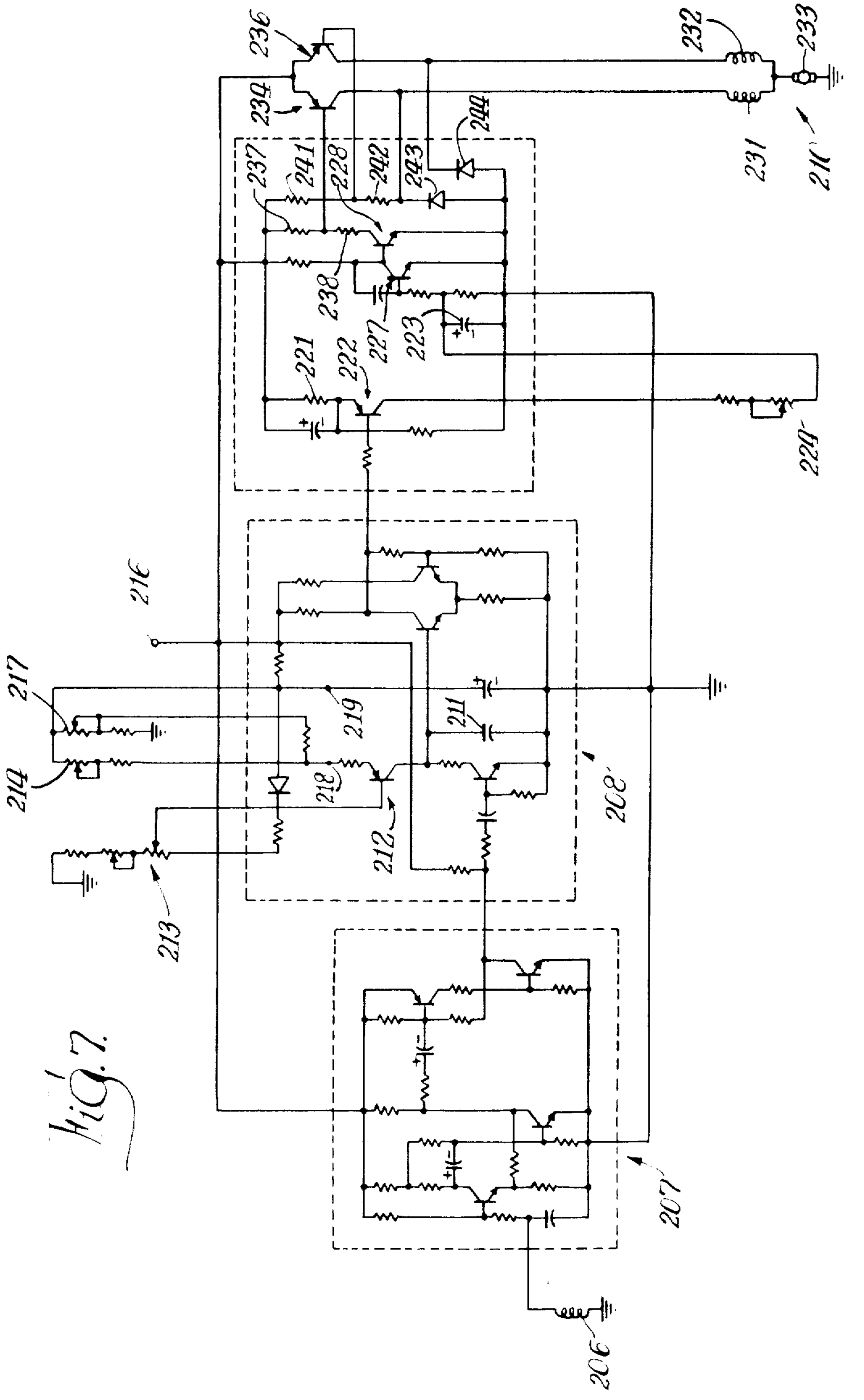

The system shown in FIG. 7 is generally similar to that shown in FIG. 6 and comprises a pick-up coil 206, a square wave generator and amplifier circuit 207 connected to receive the signals induced in the coil 206, a frequency responsive electrical circuit 208 connected to the output of the circuit 207, a circuit 209 connected to the output of the circuit 208, and an actuator 210 connected to be driven by the output of the circuit 209.

The circuit 207 is constructed and operates generally similar to the circuit 110 in FIG. 6. The circuit 208 is generally similar to the circuit 111 in FIG. 5 but includes additional means for controlling the charging current flow through a transistor 212 and a capacitor 211, which respectively correspond to the transistor 156 and the capacitor 154 in FIG. 6. The circuit 208 includes a potentiometer 213 connected to control the bias potential on the base of the transistor 212 similar to the connections between the potentiometer 164 and the transistor 156. In addition, the circuit 208 includes a variable resistor 214 connected between a positive potential terminal 216 and the emitter of the transistor 212, and a variable resistor 217 connected between the terminal 216 and ground and having its slider connected to the emitter of the transistor 212. Thus, all three potentiometers 213, 214 and 217 control the gain of the transistor 212. The potentiometers 213 and 214 are preferably located to be manually adjusted to obtain a desired critical frequency, while the variable resistor 217 may be connected to the actuator 210 such that variation in the position of the actuator 210 also varies the setting of the potentiometer 217 and thus serves as a position feedback sensing device. The connection of the actuator 210 with the potentiometer 217 is preferably such that a negative feedback loop is formed, which improves stability and prevents oscillations. The potentiometer 214 provides a fine adjustment on the setting of the potentiometer 217. The connection of the potentiometer 213 to the base of the transistor 213 is advantageous in that any adjustment of it is multiplied by the transistor 212. The two potentiometers 214 and 217 may, however, be eliminated if desired and be replaced by a fixed resistor connected between two terminals indicated by the reference numerals 218 and 219. If such a resistor were connected between the terminals 218 and 219, the two potentiometers 214 and 217 and the conductors connected thereto would be eliminated.

The circuit 209 includes a buffer amplifier 221 including a transistor 222, a capacitor 223 and a variable resistor 224 connected to the collector of the transistor 222, and two transistors 227 and 228. The foregoing components of the circuit 209 are, of course, similar to the corresponding components of the circuit 112 in FIG. 5.

The actuator 210 comprises a split field series DC motor including a pair of windings 231 and 232 and a rotor 233, the motor being under the control of a pair of transistors 234 and 236. One side of the winding of the rotor 233 is connected to ground and the other side of the rotor winding is connected to one end of each of the windings 231 and 232. The windings 231 and 232 are also respectively connected to the collectors of the two transistors 234 and 236, the emitters of these two transistors being connected to the positive potential terminal 216. The bias for the transistor 234 is determined by a pair of resistors 237 and 238 which are connected in series with the collector of the transistor 228, the base of the transistor 234 being connected to the juncture of the two resistors 237 and 238. The two resistors 237 and 238 have approximately the same ohmic value. If the potential at the terminal 216 is +12VDC, for example, the potential on the base of the transistor 234 would be approximately 11.3 volts when the transistor 228 is saturated and would be approximately 12 volts when the transistor 228 is not conducting. The bias on the base of the other transistor 236 is determined by a voltage divider comprising a pair of resistors 241 and 242 which are connected in series between the positive potential terminal 216 and the winding 231 of the actuator 210, the base of the transistor 236 being connected to the juncture of the resistors 241 and 242. Thus, current flows through the resistors 241 and 242 and through the winding 231. In addition to the foregoing components, a pair of diodes 243 and 244 are respectively connected in series between the windings 231 and 232 and the ground line, these two diodes being provided to short to ground any negative inductive voltages that may be generated in the motor windings 231 and 232.

During operation, assume that the peaks of the ripple across the capacitor 223 are not sufficiently high to switch on the transistor 227 during any portion of each cycle. The transistor 236 will then be biased on since the emitter electrode of this transistor is more positive than the base and the collector. The transistor 228 is continuously biased off, and therefore the voltage on the base of the transistor 234 will be substantially equal to the voltage on the emitter of this transistor, and the transistor 234 will therefore be biased off. With the transistor 236 biased on and the transistor 234 biased off, current will flow from the positive potential terminal 216, through the transistor 236, the winding 232, the rotor 233 and to the ground line, thereby energizing the actuator 210 for rotation in one direction.

If the frequency of the signals induced in the pick-up coil 206 is reduced sufficiently for the peaks of the ripple voltage across the capacitor 223 to bias on the transistor 227 for a portion of each cycle, the transistor 228 will also be biased on for the same portion of each cycle and the potential on the base of the transistor 234 will drop during the time interval that the transistor 228 is biased on. When the bias on the base of the transistor 234 drops, it is switched on and current flows from the terminal 216, through the transistor 234, the winding 231 and the motor 233 to the ground line. In addition, as soon as the transistor 234 begins to conduct, its collector potential rises and the voltage between the two resistors 241 and 242 jumps to substantially the potential of the terminal 216. Consequently, the transistor 236 will be biased off and the transistor 234 will be biased on, causing the actuator 210 to be energized for rotation in the opposite direction. In the portion of each cycle between the peaks of the ripple voltage across the capacitor 223, the transistor 236 will again be biased on and the transistor 234 be biased off.

If the frequency of the signals induced in the pick-up coil is sufficiently low for the transistor 227 to be biased on continuously, the transistor 234 will also be biased on continuously and cause rotation of the actuator 210 in the opposite direction.

When the potentiometer 217 is connected to be adjusted by the actuator 210, movement of the actuator varies the setting of the potentiometer and the current through the transistor 212 and the capacitor 211, and thus varies the width of the output pulses.

Figure 8:
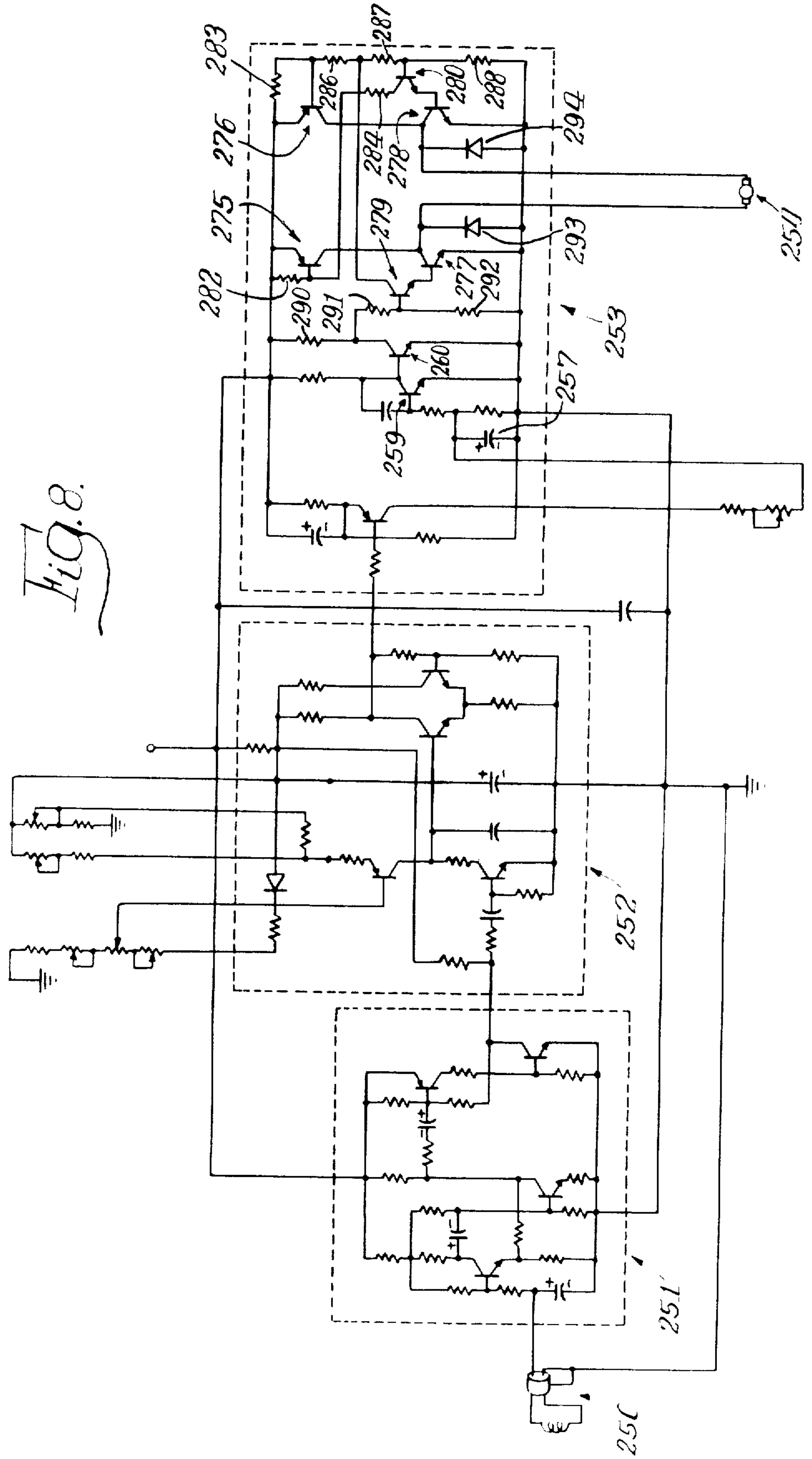

FIG. 8 illustrates another system which is generally similar to the two systems illustrated in FIGS. 6 and 7. The system shown in FIG. 8 comprises a pick-up coil 250, a square wave generator and amplifier circuit 251 which is connected to receive the signals induced in the pickup coil 250, a frequency responsive circuit 252 which is connected to receive the square waves from the circuit 251, a circuit 253 connected to the output terminal of the circuit 252, and an actuator 254 connected to be energized by the circuit 253. The two circuits 251 and 252 are generally similar to the corresponding circuits 207 and 208 in FIG. 7, and consequently no discussion of these two circuits is believed necessary. The circuit 253 includes a buffer amplifier 256, a capacitor 257, a variable resistor 258, and a pair of transistors 259 and 260 which respectively operate similar to the components 221, 223, 224, 227 and 228 of the circuit 209 shown in FIG. 7.

The actuator 254 comprises a permanent magnet motor which has its winding connected to be energized for motor rotation in one direction or the other. The energizing circuit for the motor comprises a first pair of similar PNP transistors 275 and 276, a second pair of similar NPN transistors 277 and 278, and a third pair of similar NPN transistors 279 and 280. The emitters of the two transistors 275 and 276 are connected to the positive potential terminal, the bases of the two transistors 275 and 276 are also connected to the positive potential terminal but through two similar resistors 282 and 283, and the collectors of the two transistors 275 and 276 are respectively connected to the collectors of the two transistors 277 and 278. The base of the transistor 275 is further connected to the collector of the transistors 280 through a resistor 284, and the base of the transistor 276 is connected to the collector of the transistor 279 through another similar resistor 286. The two resistors 282 and 286 are part of a voltage divider network connected between the positive potential terminal and the ground line, the voltage divider network further including two resistors 287 and 288. Thus, the base of the transistor 276 is connected to the juncture of the two resistors 283 and 286, the collector of the transistor 279 is connected to the juncture of the resistors 286 and 287, and the base of the transistor 280 is connected to the juncture of the resistors 287 and 288. Similarly, the base of the transistor 279 is connected to a voltage divider network which comprises three resistors 290, 291 and 292, these three resistors being connected in series between the positive potential terminal and the ground line, the base of the transistor 279 being connected to the juncture of the two resistors 291 and 292, and the juncture of the two resistors 290 and 291 being connected to receive signals from the collector of the transistor 260.

The emitters of the transistors 279 and 280 are respectively connected to the bases of the two transistors 277 and 278, and the emitters of the two transistors 277 and 278 are connected to the ground line. The collectors of the two transistors 277 and 278 are connected to the opposite sides of the winding of the actuator 254, the two sides of the actuator winding further being connected to the ground line through a pair of diodes 293 and 294. Again, the function of the two diodes 293 and 294 is to prevent negative voltages induced in the motor winding from reaching the collectors of the two transistors 277 and 278.

During operation, assume that the peaks of the ripple voltage across the capacitor 257 rise sufficiently high to bias on the transistor 259 during a portion of each cycle. At the time of each peak, the transistor 259 is biased on, the transistor 260 is biased off, and a positive voltage pulse appears at the juncture of the two transistors 290 and 291. In a trough between peaks, the voltage at this juncture is relatively low and consequently the transistor 279 is biased off, the voltage on the base of transistor 277 is relatively low and it is biased off, the transistors 275, 278 and 280 are biased on, and the transistor 276 is biased off. At this time, current flows through the transistors 275 and 278 and the actuator 254, and energizes it for rotation in one direction. At a voltage peak, the transistors 279, 277 and 276 are biased on and the transistors 275, 280 and 278 are biased off, and consequently the actuator 254 is energized for rotation in the opposite direction.

Thus, the energizing circuit for the actuator 254 acts as a bridge circuit and may energize the actuator 254 for rotation in either direction, hold it stationary, or move it at different speeds in either direction, depending upon the relative widths of the voltage troughs and peaks. This circuit could be used to drive the coil of a chart recorder such as the Sanborn or Brush direct pen writing oscillograph, an eddy current clutch, or any variable speed clutch. The system in FIG. 8 should also be used to demodulate or discriminate an FM signal and drive the voice coil of a speaker, the values of the components of the system being suited of course for the frequencies involved.

The circuits shown in FIGS. 7 and 8 are especially suited for controlling the speed of a movable member. In such an application, the member induces signals in the pick-up coil, the frequency of which are proportional to the speed of the member. The pulse width of the output of the multivibrator is thus inversely proportional to the speed of the member, and the potentiometers, may be adjusted to make the width of the output pulses equal to, or have a certain predetermined relation with the pulse width in the area where the voltage threshold circuit output falls to zero. The actuator would then be connected to control the speed of the member to maintain the pulse width in this area, and the potentiometer may be adjusted to have the system maintain a desired speed, and a negative feedback connection would be made from the actuator to the potentiometer 217 to improve stability.

I claim:

1. A circuit responsive to the frequency of a train of trigger signals comprising monostable multivibrator means having a stable state, an unstable state and a natural timing period during which said multivibrator means remains in said unstable state after being triggered thereto from said stable state by a trigger signal, said monostable multivibrator including adjustable timing means for varying the length of said natural timing period whereby the length of time said multivibrator means is in said unstable state may be varied by adjusting said adjustable timing means, said timing means comprising a capacitor, charging circuit means for said capacitor, and discharging circuit means for said capacitor, one of said charging and discharging circuit means being infinitely variable wherein one of said charging and discharging circuits includes a normally open circuit element connected to receive and be closed by each of said trigger signals, such closure of said circuit element resulting in the charge on said capacitor changing sharply through said circuit element.

2. A circuit responsive to the frequency of a train of trigger signals comprising monostable multivibrator means having a stable state, an unstable state and a natural timing period during which said multivibrator means remains in said unstable state after being triggered thereto from said stable state by a trigger signal, said monostable multivibrator including infinitely variable timing means for varying the length of said natural timing period, whereby the length of time said multivibrator means is in said unstable state may be varied infinitely by varying said variable timing means, said timing means comprising a charge storage element, discharging circuit means connected to receive said train of input signals and to discharge said element upon the receipt of each of said trigger signals, and charging circuit means connected to charge said element in the absence of a trigger signal, said charging circuit means including amplifier means for controlling the charging current to said element and infinitely variable means for varying the gain of said amplifier means in order to vary the rate of charging of said element.

3. A circuit responsive to the frequency of a train of trigger signals comprising monostable multivibrator means having a stable state, an unstable state and a natural timing period during which said multivibrator means remains in said unstable state after being triggered thereto from said stable state by a trigger signal, said monostable multivibrator including infinitely variable timing means for varying the length of said natural timing period whereby the length of time said multivibrator means is in said unstable state may be varied infinitely by varying said adjustable timing means, said timing means comprises a charge storage element, charging circuit means including a normally open circuit element which is connected to receive and be closed by each of said trigger signals and to charge said charge storage means upon receipt of each of said trigger signals, and discharging circuit means for discharging said element in the absence of a trigger signal, said discharging circuit means being infinitely variable to vary the rate of discharge of said element.

4. A system for controlling the speed of a moving member, comprising means for generating a train of input pulses having a frequency proportional to the speed of said member, monostable multivibrator means having a stable state, and unstable state, and a natural timing period, said monostable means being connected to receive said input pulses and generates an output pulse signal having a pulse width inversely proportional to the frequency of said train of input pulses, means for varying said natural timing period infinitely and thus infinitely varying said pulse width relative to said frequency, reversible actuator means including first and second energizing paths energizing said actuator means in one or the other of its two directions, said first and second paths being connected to receive said variable width output signals and energize said actuator means in one direction or the other depending upon said pulse width, said actuator being adapted to be connected to vary the speed of said moving member such that the frequency of said input pulses has a predetermined relation with said pulse width.

5. A system for controlling the speed of a moving member, comprising means for generating a train of input pulses having a frequency proportional to the speed of said member, monostable multivibrator means having a stable state, an unstable state, and a natural timing period, said monostable means being connected to receive said input pulses and generate an output pulse signal having a pulse width inversely proportional to the frequency of said train of input pulses, means for varying said natural timing period and thus vary said pulse width relative to said frequency, actuator means connected to receive said variable width output signals and be driven in a manner which is dependent upon said pulse width, said actuator being adapted to be connected to vary the speed of said moving member such that the frequency of said input pulses has a predetermined relation with said pulse width, and further including a negative feedback connection between said actuator and period varying means to improve the stability of said system.

6. A system for controlling the speed of a moving member, comprising means for generating a train of input pulses having a frequency proportional to the speed of said member, monostable multivibrator means having a stable state, an unstable state, and a natural timing period, said monostable means being connected to receive said input pulses and generate an output pulse signal having a pulse width inversely proportional to the frequency of said train of input pulses, means for varying said natural timing period and thus vary said pulse width relative to said frequency, actuator means connected to receive said variable width output signals and be driven in a manner which is dependent upon said pulse width, said actuator being adapted to be connected to vary the speed of said moving member such that the frequency of said input pulses has a predetermined relation with said pulse width, said actuator comprising a bidirectional electric motor, and further including a motor control circuit connected to receive said variable width output signals and control energization of said motor for operation in one direction or the other depending upon the pulse width of said output signals.

* * * * *